(12) United States Patent
Golding et al.

(10) Patent No.: US 9,297,663 B1
(45) Date of Patent: Mar. 29, 2016

(54) ADAPTIVE AND PERSONALIZED NAVIGATION SYSTEM

(71) Applicant: Google Inc., Mountain View, CA (US)

(72) Inventors: Andrew R. Golding, Mountain View, CA (US); Jens Eilstrup Rasmussen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 14/170,471

(22) Filed: Jan. 31, 2014

Related U.S. Application Data

(60) Division of application No. 12/414,461, filed on Mar. 30, 2009, now Pat. No. 8,682,574, which is a continuation of application No. 11/556,120, filed on Nov. 2, 2006, now Pat. No. 7,512,487.

(51) Int. Cl.
*G01C 21/00* (2006.01)
*G01C 21/30* (2006.01)
*G01C 21/34* (2006.01)

(52) U.S. Cl.
CPC .................................. *G01C 21/3484* (2013.01)

(58) Field of Classification Search
CPC combination set(s) only.
See application file for complete search history.

(56) References Cited

U.S. PATENT DOCUMENTS

| | | | |
|---|---|---|---|
| 5,220,507 A | 6/1993 | Kirson | |
| 5,272,638 A | 12/1993 | Martin et al. | |
| 5,307,419 A | 4/1994 | Tsujino et al. | |
| 5,434,788 A | 7/1995 | Seymour et al. | |
| 5,933,100 A | 8/1999 | Golding | |
| 6,021,371 A | 2/2000 | Fultz | |
| 6,021,372 A | 2/2000 | Harrington | |
| 6,028,550 A | 2/2000 | Froeberg et al. | |
| 6,144,917 A | 11/2000 | Walters et al. | |
| 6,308,133 B1 | 10/2001 | Loffert et al. | |
| 6,542,812 B1 | 4/2003 | Obradovich et al. | |

(Continued)

FOREIGN PATENT DOCUMENTS

EP 1193626 A1 4/2002

OTHER PUBLICATIONS

Chen, et al., "Vision-Based Autonomous Land Vehicles Guidance in Outdoor Road Environments Using Combined Lind and Road Following Techniques", Department of Computer and Information Science, National Chiao Tung University, Journal of Robotic Systems, 1997, pp. 711-728, vol. 14, Iss. 10.

Fraser, B., et al., "Usability of Geospatial Metadata of Space—Time Matters", Bulletin of the American Society for Information Science and Technology, Aug. 1999, vol. 25, No. 6, pp. 24-28.

(Continued)

*Primary Examiner* — Bhavesh V Amin
(74) *Attorney, Agent, or Firm* — Dority & Manning, P.A.

(57) ABSTRACT

Adaptive navigation techniques are disclosed that allow navigation systems to learn from a user's personal driving history. As a user drives, models are developed and maintained to learn or otherwise capture the driver's personal driving habits and preferences. Example models include road speed, hazard, favored route, and disfavored route models. Other attributes can be used as well, whether based on the user's personal driving data or driving data aggregated from a number of users. The models can be learned under explicit conditions (e.g., time of day/week, driver ID) and/or under implicit conditions (e.g., weather, drivers urgency, as inferred from sensor data). Thus, models for a plurality of attributes can be learned, as well as one or more models for each attribute under a plurality of conditions. Attributes can be weighted according to user preference. The attribute weights and/or models can be used in selecting a best route for user.

20 Claims, 5 Drawing Sheets

(56) References Cited

U.S. PATENT DOCUMENTS

| | | |
|---|---|---|
| 6,622,084 B2 | 9/2003 | Cardno et al. |
| 6,622,087 B2 | 9/2003 | Anderson |
| 6,680,674 B1 | 1/2004 | Park |
| 6,915,205 B2 | 7/2005 | Kim et al. |
| 7,031,983 B2 | 4/2006 | Israni et al. |
| 7,053,830 B2 | 5/2006 | Krumm et al. |
| 2002/0120396 A1* | 8/2002 | Boies et al. ............ 701/209 |
| 2002/0128773 A1 | 9/2002 | Chowanic et al. |
| 2003/0060973 A1 | 3/2003 | Mathews et al. |
| 2004/0078750 A1 | 4/2004 | Frank |
| 2004/0225437 A1 | 11/2004 | Endo et al. |
| 2005/0004903 A1 | 1/2005 | Tsuda |
| 2005/0071119 A1 | 3/2005 | Obradovich et al. |
| 2005/0225429 A1 | 10/2005 | Burzio |
| 2006/0271281 A1 | 11/2006 | Ahn et al. |

OTHER PUBLICATIONS

Meeks, W., et al., "Geospatial Information Utility: An Estimation of the Relevance of Geospatial Information to Users", Decision Support Systems, 2003, 17 Pages.

Summons to Attend Oral Proceedings Pursuant to Rule 115(1) EPC for European Patent Application No. EP06826074.4, Oct. 27, 2010, 6 Pages.

Communication from European Patent Office for European Patent Application No. EP06826074.4, Jan. 3, 2011, 8 Pages.

Burges, Chris, et al., "Learning to Rank Using Gradient Descent", Proceedings of the 22nd International Conference on Machine Learning, Bonn, Germany 2005, pp. 1-8.

Fukunaga, Yasuhi, et al., "Hitachi Group Initiatives as ITS Businesses Begin to Take Off", Hitachi Corporation, pp. 22-27.

\* cited by examiner

ADAPTIVE AND PERSONALIZED NAVIGATION SYSTEM

RELATED APPLICATIONS

This application is a divisional of U.S. patent application Ser. No. 12/414,461, filed on Mar. 30, 2009, and titled "Adaptive and Personalized Navigation System," which is a continuation of U.S. patent application Ser. No. 11/556,120, filed on Nov. 2, 2006, and titled "Adaptive and Personalized Navigation System," now U.S. Pat. No. 7,512,487, which is related to U.S. application Ser. No. 11/556,128, filed Nov. 2, 2006, and titled "Generating Attribute Models for Use in Adaptive Navigation Systems," now U.S. Pat. No. 7,680,749, all of which are herein incorporated in their entirety by reference.

FIELD

The invention relates to navigation systems, and more particularly, to an adaptive navigation system that learns from a user's driving history.

BACKGROUND

Vehicle navigation systems typically use position data from a global positioning system (GPS) system to determine a vehicle's location. Such systems also may include additional sensors such as an odometer or gyroscope to provide dead-reckoning navigation when GPS signals are lacking. In operation, the driver inputs a destination address into the vehicle's navigation system. The navigation system will then calculate the position of the vehicle and the route to be traveled, and guide the driver to that destination, using audible and visual instructions. The directions are derived from map data accessible to the system (e.g., stored on hard drive or CD ROM). Some systems integrate traffic information into the directions provided, thereby allowing the user to select less congested routes.

Such navigation systems, while helpful, are associated with a number of problems. One such problem is that many conventional navigation systems are not adaptive, and continue to make the same mistakes or otherwise provide undesirable directions repeatedly. For example, assume that a road called El Camino Real is slow (e.g., many traffic lights). A conventional navigation system, however, understands this road to be fast because it is also a numbered state route (CA Route 82), and therefore includes it in driving directions whenever possible, despite the driver's continued frustration with use of that route.

Some more advanced navigation systems can determine a driver's average road speed for roads frequently traversed, so that estimated travel times can be calculated. Other navigation systems can learn frequently driven routes, so that minimal instruction can be given for those routes (thereby distracting the driver less). Although such navigation systems provide additional driver support, they are still not sufficiently adaptive.

For instance, such systems fail to consider changes over time (e.g., rush-hour vs. weekend) and under different conditions (e.g., when road is under construction, different weather conditions, driver is in a hurry, local stadium event just ended, etc). In addition, conventional systems fail to consider multiple route attributes simultaneously; nor do they consider multiple conditions. Moreover, some such systems aggregate information from all users (as opposed to an individual user). These aggregate-based systems typically require a common infrastructure to be built (a centralized traffic database or server), and depend on getting a "critical mass" of early adopters for successful deployment. In addition, while such aggregated systems provide representative coverage, they fail to consider the relevance of personal driving history (e.g., the extent to which the individual driver departs from the mean in terms of driving style, preferences, and road knowledge).

What is needed, therefore, are adaptive navigation techniques.

SUMMARY

One embodiment of the present invention is a method for generating directions for use in navigation during a current driving session. The method includes receiving a route request from a user (the request including a target destination), generating a set of candidate routes (with each route including one or more segments), computing a score for each candidate route based on one or more attribute models learned from previous user driving sessions, and providing at least one scored route to the user. In one particular case, at least one of the attribute models provides a summary statistic of attribute values that have been observed during driving sessions on a particular segment. The method may further include receiving current time and user location data for use in time-sensitive route generation. In another particular case, computing a score for each candidate route based on one or more attribute models learned from previous user driving sessions includes accessing (for a target attribute of a candidate route) one or more conditional variant models associated with the target attribute, and probabilistically determining which of the one or more conditional variant models to apply to the current driving session. In one such case, probabilistically determining which of the one or more conditional variant models to apply includes determining if a conditional variant corresponds to an explicit or implicit condition. In response to the conditional variant corresponding to an explicit condition, the method may include assigning a probability of 1 to a conditional variant model that corresponds to the explicit condition, and assigning a probability of 0 to other conditional variant models associated with the target attribute. In response to the conditional variant corresponding to an implicit condition, the method may include assigning a probability to each conditional variant model associated with the target attribute, using Bayesian reasoning and observed data of the current driving session. The method may further include recomputing probabilities periodically during the current driving session, using subsequently observed data of the current driving session. In another particular case, computing a score for each candidate route further includes computing a value of the target attribute based on a conditional variant model having a highest probability of being applicable to the current driving session. In another particular case, computing a score for each candidate route further includes predicting a value for the target attribute using a combination of the conditional variant models for the attribute. The method may include assigning an attribute weight to each target attribute of each candidate route, based on attribute preferences of the user. In one such case, computing a score for each candidate route includes computing the score using target attribute values computed using the one or more attribute models, and the attribute weights. The method may further include adjusting the attribute weights based on subsequent user input. In one particular case, the method includes sorting the candidate routes based on their scores. Here, providing at least one scored route to the user includes providing a plurality of high scoring routes for user selection.

The method may further include receiving a selected route from the user, and determining if the attribute weights need to be adjusted based on that user selection. In response to the attribute weights needing to be adjusted based on that user selection, the method may further include adjusting the attribute weights based on the user selection. The one or more attribute models model, for example, different road attributes and/or a common road attribute under different conditions. The road attributes may include, for instance, road speeds, road safety, user-favored roads, and user-disfavored roads. The different conditions may include, for example, inclement weather, favorable weather, time of day, and time of week.

Another embodiment of the present invention provides one or more machine-readable mediums (e.g., one or more compact disks, diskettes, servers, memory sticks, or hard drives) encoded with instructions, that when executed by one or more processors, cause the processor to carry out a process for generating directions for use in navigation during a current driving session. This process can be, for example, similar to or a variation of the previously described method.

Another embodiment of the present invention provides a system for generating directions for use in navigation during a current driving session. The system functionality can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
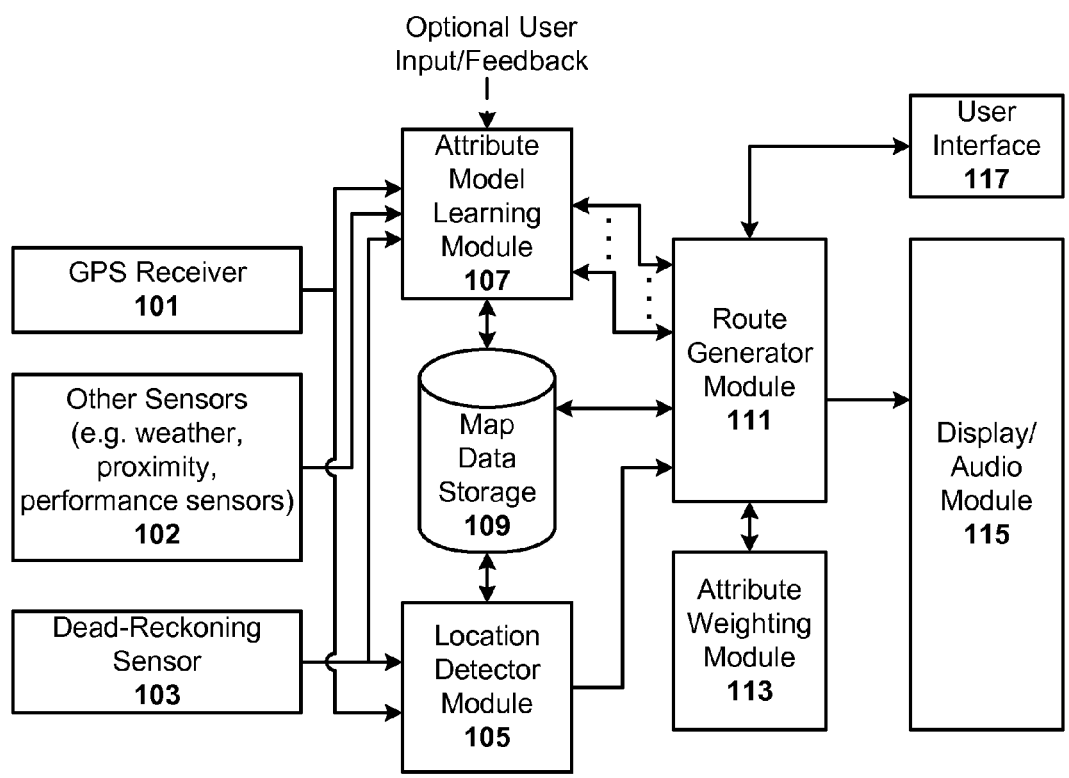
FIG. 1 is a block diagram of an adaptive navigation system configured in accordance with one embodiment of the present invention.

Navigation techniques are disclosed that are adaptive to changes over time and changes under other conditions, and personalized to an individual's driving style, preferences, and road knowledge. The techniques can optionally be used in conjunction with data aggregated from multiple users to provide benefits of both individual and group based data, if so desired.

General Overview

As a user drives, modelers are employed to develop and maintain attribute models, which effectively capture the driver's personal driving habits and preferences. Example models include road speed models, hazard models, favored route models, and disfavored route models. Other attributes associated with user's driving experiences can be modeled as well, whether based on the user's personal driving data or driving data aggregated from a number of users. In one particular embodiment, each of the modelers is configured to learn not just one model for an attribute, but rather a plurality of alternate models, with each alternate corresponding to conditions that impact the attribute in some way. In one such configuration, these conditions can be defined in two ways: predefined or "explicit" conditions and inferred or "implicit" conditions.

Explicit Conditions: Consider, for example, a road speed modeler that is configured to learn four separate models: a morning rush-hour model (e.g., 6:30 am to 9:30 am, Monday through Friday), an evening rush-hour model (e.g., 3:30 pm to 6:30 pm, Monday through Friday), mid-day weekday model (e.g., 9:30 am through 3:30 pm, or other non-rush-hour weekday times), and a weekend model. When the road speed modeler collects its observations of road speed data, it files them into whichever one of the four models currently applies (e.g., assuming the system has access to day-of-week and time-of-day info). Likewise, when the road speed modeler predicts travel times, it also uses whichever of the four models currently applies. In this example, the explicit conditions are the day-of-week and time-of-day. Another example of explicit condition is the particular driver of the car during any one driving session. Here, there can be one attribute model (or set of attribute models) for each driver of the car (assuming the system has access to driver ID info).

Implicit conditions: Practically speaking, and continuing with the road speed modeler example, there are innumerable conditions that can affect road speed, such as whether the driver is in a hurry, various weather conditions, whether a sports or concert event has just ended, whether there is an accident or road construction ahead, and so on. The explicit conditions approach is infeasible for handling all of these possible circumstances, both because it is difficult to anticipate all of them, and because it is difficult to supply the system with the information needed to deduce which condition applies (e.g., as done with day-of-week and time-of-day, or driver ID info). Thus, a clustering approach can be employed. This approach starts with mini-models of the attribute of interest (such as road speed), each mini-model corresponding to a single driving session (note that a mini-model may include multiple reads within each session). The mini-models are merged ("clustered") together if they have similar data, as determined by using a similarity metric. One algorithm for implementing this clustering is hierarchical agglomerative clustering (HAC). The algorithm produces a set of conditional variants of an attribute model, each corresponding to some condition that affects driving (e.g., whether the driver is in a hurry, whether it's raining/snowing, whether it's a holiday, whether there's a slowdown due to an accident/construction ahead, and so on).

Once a set of conditional variants has been inferred/derived or predefined, which one applies to any given driving session can be determined. This process is relatively straightforward with explicit conditions, because explicit rules are predefined (e.g., this is the variant to be used weekdays M-F, from 6:30 am to 9:30 am). But with implicit conditions, there are no such rules. Thus, and in accordance with one particular embodiment of the present invention, probabilistic modeling with Bayesian updates can be employed. As a new driving session is started, a prior probability (or weight) is initially assigned to each of the N conditions. As driving proceeds, observations are collected about driving speeds (or application of the brakes, or whatever other driving events are relevant to the attribute model at issue). Each time an observation is collected, a determination is effectively made as to how consistent is that observation with each of the N conditions. A Bayesian update of the probability (or weight) is performed on each of the N conditions accordingly. Thus, at any moment in time, there is a set of probabilities (or weights), one weight per condition, that indicates how likely it is that a particular condition in fact applies to the current driving session. Recall that in the explicit conditions case, it is known with certainty which condition applies (e.g., if it is Wednesday at 7:30 am, then the "rush hour" condition applies). In the implicit conditions case, there is only a probability on each condition (e.g., 0.8 for the "rainy weather" condition, and 0.2 for the "dry weather" condition). In this example case, the rainy weather attribute model can be used (based on the higher weight currently assigned to the "rainy weather" condition relative to the weight currently assigned to the "dry weather" condition). In addition, when predicting travel time of a proposed route, the system can combine the travel time predictions of the rainy-weather and dry-weather conditional variants of the road speed model, using a weighted average with probabilities 0.8 and 0.2. Note that this is a case of using multiple conditional variants of an attribute model to evaluate an attribute.

In addition to, or as an alternative, each candidate route that could be used to guide the user to a target destination can be scored for desirability based on a combination of that route's attributes (e.g., fastest and most scenic route, or fastest non-highway route), where an appropriate weight is learned for each route attribute based on user feedback. Learning the attribute weights can be achieved using techniques for learning a ranking metric. For example, if the top three route choices are presented to the user according to current desirability scores, and the user chooses route #2 or #3, then the attribute weights are adjusted to favor the selected route relative to the routes that precede it in the initial ordering. Attributes may include, for instance, road speed, road familiarity, road safety, disfavored roads, scenic quality, road length, road type (e.g., highway vs. local road), or any other attribute that could affect a user's route preference. Note that modeling is not needed for all of these attributes (e.g., road length data can be pre-supplied; therefore, it is not necessary to learn models of it or conditional variants of the model).

Models for several attributes (e.g., such as road speed, road familiarity, road safety, and disfavored roads) can be learned while contemporaneously learning conditional variants of each attribute separately. For example, conditional variants of a road-safety attribute model can be learned, which may correspond to a "wet weather" road-safety model, and a "dry weather" road-safety model. It will be appreciated that such a conditional variants approach can be applied to all attributes (i.e., not specific to just road speeds).

Thus, one embodiment of the present invention provides a navigation system configured for inferring conditional variants of road attribute models and reasoning probabilistically from them, and learning to use multiple route attributes to compute an overall route desirability score. In general, the system can be implemented, for example, with an attribute model learner function, a route finder function, and a desirability metric learner function, along with other conventional navigation system functions. The attribute model learner function is configured to learn an attribute in the form of a set of conditional variants. This function can be carried out off-line (e.g., in advance of receiving a request for directions). The route finder function is configured to generate an ordered list of routes from point A to point B and lets the user pick one. The desirability metric learner function is configured to learn a set of weights on the attributes, and defines an overall "desirability" metric for routes. Each of the route finder function and the desirability metric learner function can be carried out on-line (e.g., in response to a request for directions). The off-line functional component involves applying the attribute model learner to one or more attributes used for choosing a route (e.g., road speed, road safety, scenicness of route, disfavored roads). The on-line functional component involves finding a route, and subsequently adjusting the desirability metric based on which route the user selected from the list of routes presented. Note that the off-line functional component can (and should) be re-applied periodically, as the system accumulates more driving sessions during normal operation.

System Architecture

FIG. 1 is a block diagram of an adaptive navigation system configured in accordance with one embodiment of the present invention.

As can be seen, the system includes a GPS receiver 101, a dead-reckoning sensor 103, a location detector module 105, an attribute model learning module 107, a map data storage 109, a route generator module 111, an attribute weighting module 113, a display/audio module 115, and a user interface module 117. The system may also include one or more other sensors (generally referred to as other sensors 102). The system can be used, for example, in a vehicle such as a car, truck, taxi, bus, and other such moving vehicles. Although such examples favor land-based navigation, the same principles can be applied to water-based (e.g., vessels) and air-based (e.g., airplanes) navigation, if so desired.

The GPS receiver 101 is configured for receiving GPS signals, and can be implemented with conventional technology. As is known, GPS satellites broadcast precise timing signals by radio frequency to the GPS receiver 101. This allows GPS receiver 101 to accurately determine their current location (longitude, latitude, and altitude). This determination can be made in real-time, and in any weather conditions. The GPS receiver 101 receives the GPS timing signals, and outputs the current time and corresponding location data (e.g., geometric coordinates x, y, z) of the vehicle (or other guided entity). The time and location data is then provided to each of the learning module 107 and the location detector module 105.

The dead-reckoning sensor 103 is configured for detecting the vehicle's relative location and direction of movement, based on previous location data. This sensor 103 can be implemented with conventional technology. For instance, the dead-reckoning sensor 103 may include a sensor for measuring travel distance (e.g., speedometer, accelerometer, odometer), and a sensor for measuring a rotation angle (e.g., gyroscope, geomagnetic sensor). Thus, the dead-reckoning sensor 103 senses the velocity and direction of vehicle movement, and provides that data to each of the learning module 107 and the location detector module 105.

Note that other sensors 102 may also be included to provide data to the learning module 107 and/or the location detector module 105. These other sensors may include, for example, vehicle performance sensors (e.g., speedometer, accelerometer, decelerometer, horn-use sensor, braking sensor, turn-radius sensor based on steering wheel position, etc), proximity sensors (e.g., IR transceivers for sensing close traffic and possibly dangerous roadways such as narrow underpasses or parking ramps), weather and atmospheric sensors (e.g., thermometer, barometer, visibility/fog sensors, snow/ice sensors, etc). Further note that such other sensors 102 may be integral to the GPS receiver 101 and/or dead-reckoning sensor 103, or may exist as independently from receiver 101 sensor 103.

The map data storage 109 stores digital map data that can be used to guide the user, and can be implemented with conventional technology. As is typically done, a map of the area covered by the navigation system is divided into sections of a predetermined size. Map information (e.g., roads, intersections, etc) is displayed by the use of nodes and links in each of the map sections. In other embodiments, data storage 109 stores raw map data (e.g., Navteq and/or Teleatlas data), and further includes an API that draws the corresponding map for display, in real-time. Numerous known map data storage and/or drawing techniques can be employed. As will be apparent in light of this disclosure, the storage 109 may also store other information used in the attribute model learning and/or route generation processes. Such other information may include, for example, attribute estimate rules, attribute weights that specify the relative importance of each attribute in determining overall route desirability for the particular user, sensor data, user preferences, etc.

The location detector module 105 is programmed or otherwise configured to retrieve map data of the target area from storage 109, based on the vehicle's location as indicated by the GPS receiver 101 and the dead-reckoning sensor 103, and to perform map-matching. As is known, map-matching uses digital map data and GPS data to locate a vehicle on the proper position relative to the digital map. This map-matching process helps to compensate for error associated with measurements made by the GPS receiver 101 and/or dead-reckoning sensor 103. Any number of conventional map-matching algorithms can be employed by the location detector module 105.

The attribute model learning module 107 is programmed or otherwise configured to receive data from each of the GPS receiver 101, dead-reckoning sensor 103, and any other suitable sensors 102, as well as optional user input and/or feedback, and to compute models of various attributes associated with the user's driving experiences. In one particular embodiment, the modeled attributes include road speed, favored routes, disfavored routes, and hazardous routes. An attribute model is derived from one or more driving sessions, and in accordance with one particular embodiment, includes a mapping from road segment to attribute value and an estimate of the attribute value for "unseen" road segments (segments not yet actually traveled on by the user). The mapping only covers road segments that have been traversed at least once in the driving sessions from which the model was derived, and gives a summary statistic (such as mean or median or other suitable statistic) of the attribute values that have been observed in other driving sessions for that segment. The estimate of the attribute value for unseen road segments can be a default value, such as summary statistic (e.g., mean or median or other suitable statistic) over all segments in the model, or only over segments that are similar to the road segment for which the system is trying to estimate a value (e.g., only over 4-lane highways).

Example input (or otherwise available data) to the learning module 107 includes the name of the attribute for which to learn models, a set of driving sessions, one or more attribute estimation rules for estimating a value of the desired attribute from sensor measurements (e.g., where the value is either directly measured, or inferred from one or more measurements), and a similarity metric for comparing two models of the attribute. Each of driving sessions includes a set of measurements relevant to the desired attribute (e.g., driving speeds to learn a road speed attribute model). The measurements are taken along the route traversed in that driving session by sensors such as GPS receiver 101, dead-reckoning sensor 103, and other sensors, such as vehicle performance sensors (e.g., braking, accelerating, speed, etc), proximity sensors (e.g., closeness to other vehicles and roadway objects, etc), and weather and atmospheric sensors (e.g., temperature, rain, ice, snow, etc), as previously explained. The attribute estimation rules (which can be stored in storage 109, for example) may be identity rules or more complex rules, depending on the particular attribute. For example, for the attribute of road speed, an identity rule applies, where the measurement is road speed (e.g., as measured by a speedometer or other suitable means), and the desired attribute is road speed. For road safety, the attribute estimation rule or rules are more complex and use, for instance, a scoring system to estimate road safety from "observable" (via operation of sensors) events such as skids, short stops, consistent braking, brake pumping over longer distances, weather conditions, traffic conditions, and slow driving. The similarity metric can be encoded in the learning module 107 itself, and compares two models based primarily on road segments for which they both have mapped values, but if there is insufficient overlap between the two models, then the similarity metric may compare road segments for which one or both models only has an estimate of the attribute value. The similarity metric also has the option of returning "unknown" as the similarity between two models if they have insufficient overlap.

Example output of the learning module 107 is a set of statistical models for each modeled attribute. Each model is a "conditional variant" that models the target attribute under an explicit or implicit condition. An example explicit condition is: active time of model is between 6:30 am and 9:30 am M-F (i.e., rush hour). An example implicit condition is: the system is provided with a set of driving sessions of road speed data, and the learning module 107 forms two groups, one corresponding to driving in rainy conditions and one corresponding to driving in dry conditions. As will be apparent in light of this disclosure, the system does not realize that the two conditional variants are correlated with weather conditions; rather, the system merely notices that the road speed patterns fall into two distinct groups.

Thus, the learning module 107 can learn an attribute model, in the form a set of conditional variants of the model. In addition, the learning module 107 develops and refines the attribute models as the user drives, thereby effectively creating robust personal driving models for the user. Further, note that each user of the vehicle can have his or her own set of models. The attribute model learning module 107 will be discussed in further detail with reference to FIGS. 2 and 3.

The route generator module 111 is programmed or otherwise configured to receive or otherwise access attribute models from the learning module 107 and location/timing data from the location detector module 105, as well as a target destination from the user interface 117, and to compute one or more routes to that target destination. The computed routes are then provided to the user via the display/audio module 115. Each of the user interface 117 and the display/audio module 115 can be implemented using conventional data entry and output interfaces (e.g., keyboard, touchpad, and/or voice recognition for facilitating input by user; and a display and/or verbal commands for facilitating output by the system). In addition, the route generator 111 can be configured to effectively combine the various attribute models (e.g., road speed, road hazards, etc) into an overall score that represents the quality or desirability of a given route (based on the user's personal driving habits as reflected in the models). In this sense, the route generator 111 generates a number of route choices for the user, and then picks or suggests the best one of those routes for that particular user.

Example input to the route generator module 111 includes a target destination, a set of attribute models, current driving session data, attribute estimation rules, and a set of attribute weights. The set of attribute models is generated by the learning module 107 (e.g., generated during one or more off-line learning sessions). As previously explained, each attribute may have a set of models for conditional variants of that attribute (e.g., road speed model for rush-hour and a road speed model for weekends). The current driving session data is a set of measurements taken during the driving session so far (up to the point where the user is asking for directions). The measurements can be taken by sensors such as GPS receiver 101, dead-reckoning sensor 103, and other sensors 102 previously discussed (e.g., performance sensors, proximity sensors, and atmospheric sensors). Such driving session data can be used to help determine which conditional variant of each applicable attribute model to use. The attribute estimation rules are for estimating a value for the desired attribute from the measurements, and can be the same rules used by the learning module 107. These rules are used by the route generator module 111 to convert the sensor measurements in the driving session so far into attribute values. The set of attribute weights specify the relative importance of each attribute in overall route desirability for the particular user. In this example embodiment, the set of weights is learned by the attribute weighting module 113, as will be explained in turn.

Example output of the route generator module 111 includes a list of candidate routes from point A (e.g., user's current position) to B (e.g., target destination input by user), sorted by decreasing desirability. The route generator module 111 may also output a route from A to B, selected by the user from the candidate routes. Recall that the route ultimately selected by the user may be different from the route having the highest desirability score. The route generator 111 will be discussed in further detail with reference to FIGS. 4a and 4b.

The attribute weighting module 113 is programmed or otherwise configured to learn a set of attribute weights that provided to the route generator module 111 for combining the different attributes into an overall metric for estimating desirability of a route. Example input to the attribute weighting module 113 includes a set of attribute weights (one for each attribute used so far), a list of candidate routes, and the route ultimately selected by the user. Initially, the attribute weights are set to default values that capture the relative importance of the different attributes in the general population of drivers (e.g., high weight on road speed, moderate weight on route simplicity, moderate weight on route safety). These attribute weights can be stored, for example, in the module 113 itself or in storage 109 (or in some other suitable storage), and are refined as attribute desirability learning occurs based on user input. The list of candidate routes is sorted by decreasing desirability score, as produced by the route generator module 111. Example output of the attribute weighting module 113 includes a default set of attribute weights or a modified set of attribute weights (based on actual route selections by user) to use in the future.

In operation, once learning module 107 has learned models of several different attributes (e.g., road speed, preferences, road hazards, etc), they can be effectively combined into an overall score of the desirability of a given route, in accordance with one embodiment of the present invention. This combining can be carried out, for example, by the route generator module 111 or some other dedicated route scoring module. In one particular embodiment, the form for such a route score is a linear combination. In one such case, the desirability score for route r is computed by the route generator module 111 as follows: $Score_r = SUM\ w_i\ x_i$. Here, i represents a particular attribute and is a number in the range of 1 to I, where I equals the total number of route attributes; $x_i$ represents values of the attributes of route r (e.g., the length of the route, the expected travel time of the route, the hazard level of the route, user familiarity with the route, user fondness/dislike of the route, average user speed on the route, and so on); and $w_i$ represents the attribute weights that are learned by module 113 based on user input/action.

The problem of learning the attribute weights $w_i$ from examples can be thought of as learning a ranking metric. In one embodiment of the present invention, the attribute weighting module 113 employs a gradient descent technique. In more detail, the technique begins with setting the attribute weights to default values. Each candidate route (generated by the route generator module 111) is scored using these initial attribute weights in accordance with the $Score_r$ formula. The top N highest-scoring routes can then be presented to the user (e.g., assume there are three high-scoring routes: #1, #2, and #3). If the user selects route #1, then there is nothing to learn. However, if the user selects, for example, route #3, then a number of preferences can be learned. For instance, in this particular example, it is now known that the user prefers route #3 over both route #1 and route #2.

With this learned information, the attribute weighting module 113 can construct a new attribute vector d, by taking the attribute vector for route #3 and subtracting the attribute vector for route #1. If the desirability score is then applied to vector d, it will give a negative score (because #1 outscores #3). The learning carried out by the attribute weighting module 113 is to adjust the weights $w_i$ so as to reduce the negativity of this score. For each attribute $x_i$ that is larger for route #3 than for route #1, its weight $w_i$ is increased in the $Score_r$ formula. For each attribute $x_i$ that is smaller for route #3 than for route #1, its weight $w_i$ is decreased in the $Score_r$ formula. In this way, the score assigned by the $Score_r$ formula to route #3 is increased relative to the score assigned by the $Score_r$ formula to route #1.

Various techniques can be used by the attribute weighting module 113 to determine the amount by which the weights are adjusted. In general, the larger the margin between the desirability scores of route #3 and route #1, the greater the adjustment. In one particular embodiment, an attribute weight is updated by the following equation: $w'_i = w_i + [gamma*corr]$, where: $w'_i$ is the adjusted weight; $w_i$ is the original weight; gamma is the learning rate, a positive scalar that determines how radically the weights are tuned; and corr is a correction factor related to the margin between the desirability scores of the two routes, where $corr = (Score_r^{\#1} - Score_r^{\#3})/(attribute\ x_i^{\#3} - attribute\ x_i^{\#1})$.

Consider the following example. Assume:
$x_i^{\#3}$ = value of attribute $x_i$ for preferred route #3=10;
$Score_r^{\#3}$ = desirability score of route #3=200;
$x_i^{\#1}$ = value of attribute $x_i$ for non-preferred route #1=2;
$Score_r^{\#1}$ = desirability score of route #1=280;
weight $w_i$=16; and
gamma=1.0.
Then:
$w'_i = w_i + [gamma*corr]$
$w'_i = 16 + [1.0*((280-200)/10-2)]$
$w'_i = 16 + 10$
$w'_i = 26$ Recalling the desirability $Score_r = SUM\ w_i\ x_i$, this increase in $w_i$ by 10 will in turn increase $Score_r^{\#3}$ by $10*x_i^{\#3} = 10*10 = 100$, while increasing $Score_r^{\#1}$ by $10*x_i^{\#1} = 10*2 = 20$, for a net increase of 80 in $Score_r^{\#3}$. This is just enough to bring $Score_r^{\#3}$ into equality with $Score_r^{\#1}$. If gamma had been less than 1.0, then $Score_r^{\#3}$ would not have caught up to $Score_r^{\#1}$; and if gamma had been greater than 1.0, it would have surpassed $Score_r^{\#1}$.

As with the other forms of learning discussed herein, this learning process could allow for manual overrides by way of user feedback/input (e.g., a driver could explicitly specify the importance of different attributes in route selection). The process of generating driving directions based on the attribute models and attribute weights is further discussed with reference to FIGS. 4a and 4b.

Attribute Model Learning Module

Figure 2:
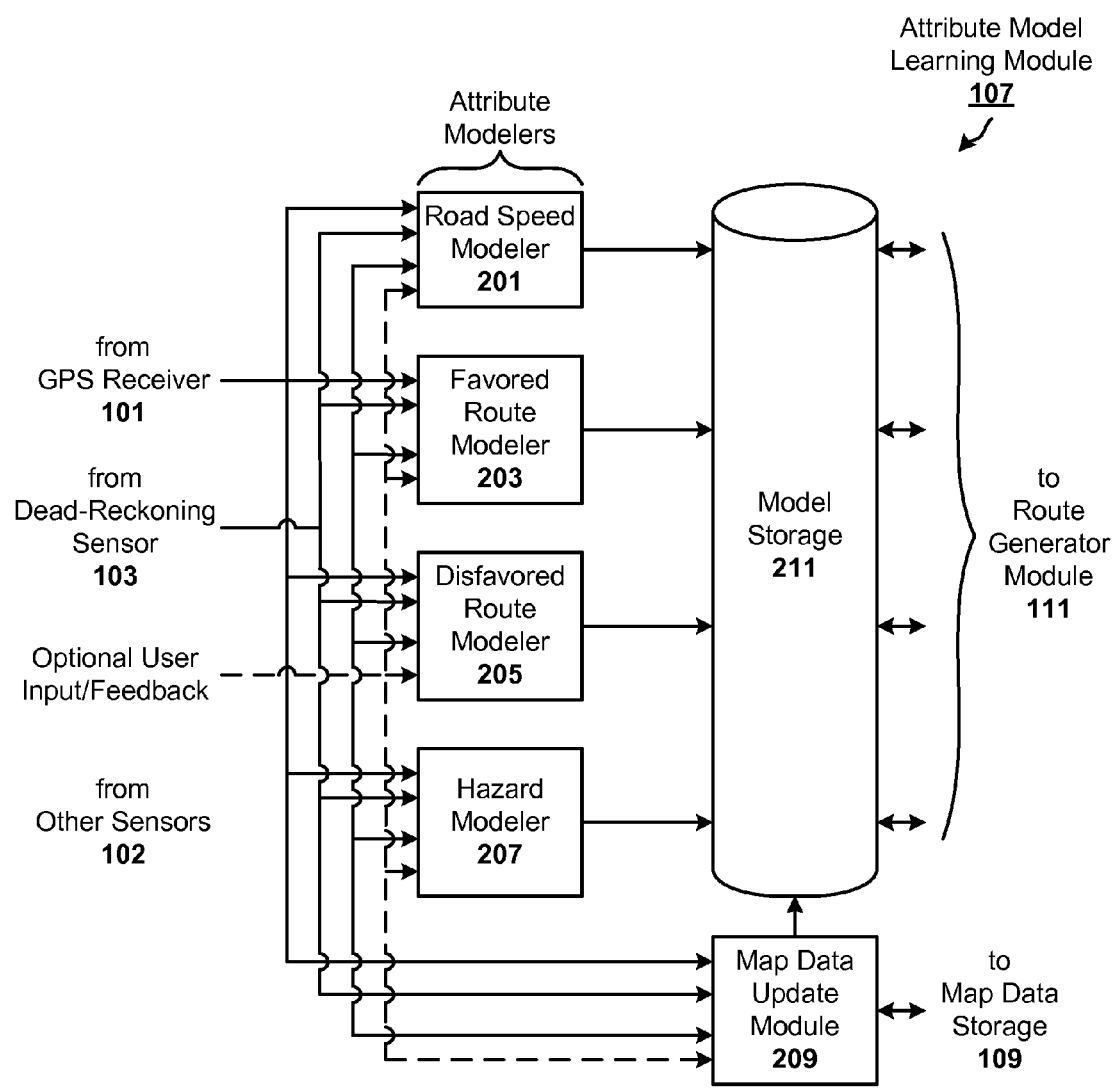
FIG. 2 is a block diagram of an attribute model learning module of the adaptive navigation system of FIG. 1, configured in accordance with one embodiment of the present invention.

FIG. 2 is a block diagram of the attribute model learning module 107 of the adaptive navigation system of FIG. 1, configured in accordance with one embodiment of the present invention.

As can be seen, the attribute model learning module 107 includes a road speed modeler 201, a favored route modeler 203, a disfavored route modeler 205, a hazard modeler 207, a map data update module 209, and a model storage 211. Each of the illustrated components can be implemented in software (e.g., C, C++, Java, or other suitable programming language) that executes on a processor. However, other embodiments could be implemented, for example, in hardware (such as in gate level logic or ASIC), or firmware (e.g., microcontroller configured with I/O capability for receiving data from external sources and a number of routines for implementing learning functions as described herein), or some combination thereof. In addition, note that the modules are shown as separate for purposes of illustration, and that other embodiments may have the various functionalities or sub-sets thereof integrated into a single module. Numerous configurations will be apparent in light of this disclosure.

The road speed modeler 201 is programmed or otherwise configured to learn one or more models of a driver's road speeds. In more detail, a car navigation system is already aware of a vehicle's position via the GPS receiver 101 and/or dead-reckoning sensor 103. The road speed modeler 201 can therefore empirically measure average speed along different road segments, and gradually build up an empirical model of road speed. Alternatively, the road speed modeler 201 can use other sensors, such as a speedometer to build the road speed model. In any case, the navigation system can then attempt to give "fastest route" directions based on learned data. Note that this model is customized not only to particular roads and their idiosyncrasies (e.g., speed bumps, school zones, etc), but also to a particular driver's driving style. If a driver drives at 70 mph on route 101, modeler 201 will learn that route 101 is much faster than local roads for that driver. Road segments are the atomic units for which road speeds can be learned. A road segment can be defined as a transition from one stretch of road to another (e.g., from the middle of one city block to the middle of the next block). For instance, entering a four-way intersection, there are up to four such transitions from the vehicle's starting point (go straight, left turn, right turn, and U-turn). This allows transition time to be captured in the road-segment data, which often accounts for a significant proportion of travel time in city driving.

In one particular embodiment, the road speed modeler 201 is configured to learn not just one aggregate road model, but rather a plurality of alternate models, with each alternate model corresponding to explicit and/or implicit conditions. As previously explained, explicit conditions (e.g., such as time of day, day of week, driver ID, and other relatively predictable or otherwise consistent conditions) can be hard coded or otherwise "predefined" into the road speed modeler 201 (or other modelers), so that alternate models are provided (e.g., morning rush-hour model, evening rush-hour model, mid-day weekday model, and weekend model). When the road speed modeler 201 collects its observations of road speed data, it files them into whichever one of the alternate models currently applies (based on the predefined/explicit condition that is satisfied). With regard to implicit conditions, the road speed modeler 201 can be configured for learning an open-ended set of alternate road speed models, each corresponding to some condition that affects driving (e.g., whether the driver is in a hurry, whether it's raining/snowing, whether it's a holiday, whether there's a slowdown due to an accident or construction ahead, and so on). In one such embodiment, clustering is used to form the alternate models. For example, and as previously explained, the well-known technique of hierarchical agglomerative clustering (HAC) can be used. In one such configuration, one "mini-model" of road speed is constructed for each individual driving session, where a driving session is the interval from turning the engine on to turning it off. The road speed modeler 201 further defines a similarity metric that measures the degree of similarity between two mini-models of road speed by comparing, for example, the smoothed distribution of road speeds on each road segment that is in common between the two models. Two distributions may be compared using any known measure of distribution distance, such as Kullback-Leibler (KL) distance. If two mini-models have little or no overlap, their similarity is undefined. At each step of HAC, the pair of mini-models that are most similar to each other are identified by the similarity metric. The two mini-models can then be merged by pooling their data. This process is continued for available road speed mini-model pairs until a stopping criterion is reached. For example, if there is no pair of mini-models remaining whose similarity is above a pre-set threshold. Upon satisfaction of the stopping criterion, a set of alternate models representing distinct road speed conditions remain.

These alternate road speed models effectively capture differences due to predefined/explicit conditions (e.g., such as which family member is driving the car, time of day, day of week, etc) as well as inferred/implicit conditions that are not explicitly known to the navigation system (e.g., whether the driver is in a hurry, whether it's raining/snowing, whether it's a holiday, whether there's a slowdown due to an accident/construction ahead, and so on). As will be appreciated in light of this disclosure, other attribute modelers such as the favored route modeler 203 and hazard modeler 207, can be configured to provide a set of alternate models, with each alternate corresponding to a predefined or inferred condition.

The one or more road speed models learned by the road speed modeler 201 are stored in the model storage 211, and can be applied to future navigation sessions in a variety of ways. Once a set of conditional variants has been produced, which one applies to any given driving session can be determined. As previously explained, this process is relatively straightforward with predefined conditions, because explicit rules are used (e.g., this is the variant to be used weekdays M-F, from 6:30 am to 9:30 am). But with inferred conditions, there are no such rules. Thus, and in accordance with one particular embodiment of the present invention, the road speed modeler 201 employs probabilistic modeling with Bayesian updates. In more detail, as a new driving session is started, a prior probability (or weight) is initially assigned to each of the N inferred conditions. As driving proceeds, the road speed modeler 201 collects observations about driving speeds (or application of the brakes, or whatever other driving events are relevant to the attribute model at issue). Each time an observation is collected by the road speed modeler 201, a determination is made as to how consistent is that observation with each of the N inferred conditions. The road speed modeler 201 performs a Bayesian update of the probability (or weight) on each of the N conditions accordingly. Thus, at any moment in time, there is a set of probabilities (or weights), one weight per condition, that indicates how likely it is that a particular condition in fact applies to the current driving session. This set of condition weights can be stored, for example, along with the road speed models in the storage 211. The route generator module 111 can then reason probabilistically from those weights when generating route candidates. For instance, assume a "rainy weather" condition has a weight of 0.8, and a "dry weather" condition has a weight of 0.2. In this example case, the rainy weather road speed model can be used as opposed to the alternate dry weather road speed model (based on the higher weight currently assigned to the "rainy weather" condition relative to the weight currently assigned to the "dry weather" condition). In addition, when predicting travel time of a proposed route, the route generator module 111 can combine the travel time predictions of the rainy-weather and dry-weather conditional variants of the road speed model, using a weighted average with weights 0.8 and 0.2, thereby using multiple conditional variants of the road speed model to evaluate travel time.

This Bayesian scheme may be further varied, as will be apparent in light of this disclosure. For example, the change in probabilities (weights) can be capped at a predefined time step (e.g., every N seconds) to reduce instabilities in the system. Also, changing or otherwise manipulating the probabilities early on in the driving session can also be employed, until enough data is gathered to be confident about which learned model best applies. Note that in addition to using the learned road speed models to improve route-finding, they can also be used to more accurately predict travel times (e.g., for use in an "estimated travel time" or "ETA" display). In addition, recall that Bayesian reasoning requires a training set; namely, a set of attribute values and the implicit condition to which they have been assigned. For instance, if the implicit conditions are rainy weather and dry weather, and it has been observed that so far, the driver is averaging 35 mph over a given road segment, then a training set can be used to indicate whether an average speed of 35 mph on that road segment is more indicative of rainy weather or dry weather. Such a training set is provided, for example, by the set of driving sessions that were previously clustered into the rainy weather condition and the dry weather condition as explained herein.

The road speed modeler 201 may also receive optional user input and/or feedback relevant to road speeds. Such optional input can be used to correct or otherwise adjust, for example, road speeds learned during anomaly conditions (e.g., traffic accident) that do not reflect the typical speeds for a given road at a given time. In one such embodiment, the road speed modeler 201 uses the optional user input/feedback to trump and replace any previous learning for the particular road associated with the optional input. Alternatively, the road speed modeler 201 factors the optional user input/feedback into the existing model just as any other additional road speed data is integrated, as described herein. In such a case, the user can effectively bias the learned models as desired.

The favored route modeler 203 is programmed or otherwise configured to learn one or more models of road familiarity. In particular, the favored route modeler 203 observes which roads are frequently traversed, especially when the user is driving without using the navigation system (e.g., observation mode, as opposed to navigation mode or navigation-observation mode). The route generator module 111 can then use this road familiarity model to favor roads with which the user is familiar when providing directions (effectively penalizing less familiar roads). Thus, the system is capable of providing directions based on more than just a minimal driving time goal, unlike conventional systems. The favored route modeler 203 enables, for example, a more complex route finding function that can reduce the probability of the driver making a wrong turn and/or expending additional cognitive effort. Note that the favored route modeler 203 may also enable the route generator module 111 to provide route selections with fewer turns (assuming the driver's preferred routes have fewer turns). In a similar fashion, the favored route modeler 203 may also enable the route generator module 111 to provide more scenic route selections with (assuming the driver's preferred routes are scenic). Other such benefits and/or features of the favored route modeler 203 will be apparent in light of this disclosure.

The favored route modeler 203 also enables summarized directions. In more detail, the navigation system "knows" (based on information provided by the favored route modeler 203) that the driver is very familiar with a particular highway and how to access that highway when in a given local area. Assume, for example, that the driver knows how to access route 101 when within five miles of a known set of GPS coordinates. The favored route modeler (203, which receives GPS coordinates from GPS receiver 101, would indicate the favored status of and familiarity with accessing route 101. Favored status and familiarity can be indicated in a number of ways, such as an unfamiliar road penalty (as previously discussed), a familiar road bonus, and/or a counter that counts the number of times a particular road has been traveled in a given time period (e.g., roads traveled 5 times or more within a 15 to 20 day period are given a familiarity bonus). With such familiarity of route 101 so identified or otherwise known, directions provided to the user by the route generator module 111 can be summarized to "Take 101 North" since the driver already knows how to access that route from his current location. Numerous opportunities to provide summarized or concise directions based on user familiarity are thus enabled. Note, however, that the navigation system can be further configured to break down summarized steps into detailed directions at the user's request (e.g., by operation of user interface 117 to allow for the request to be made and route generator module 111 to provide more detailed directions; alternatively, the detailed directions can automatically be provided to the user and not displayed unless requested by the user).

The favored route modeler 203 can also receive optional user input/feedback to allow further customization of the favored route models. For example, and in one particular embodiment, roads that are believed to be familiar to the user can be displayed in a different color and/or with a "familiar" label (e.g., a heart or star icon or the like). In one such case, the navigation system allows the user to give verbal or other feedback (e.g., by operation of the user interface 117) confirming or disconfirming that the road is in fact familiar to him, and/or one that he prefers/disprefers for any reason. Such explicit user feedback/input can be used to trump any previous learning (for a given route or segment) by the favored route modeler 203.

Note that such preferences (as well as road speeds and other modeled attributes discussed herein) will vary from one driver to the next, assuming more than one person drives the vehicle equipped with the navigation system. Thus, a driver ID mechanism can be implemented to prevent confusing models of one driver with models of another driver. In one such case, a login mechanism is used where the driver ID is keyed in, spoken, or otherwise entered (e.g., by operation of user interface 117). Likewise, the driver ID mechanism could even be automated, for example, such as an ID mechanism based on a specially configured ignition key, preferred seat and/or mirror settings, and/or a weight sensor in the driver seat (assuming drivers can be distinguished by such parameters). Such parameters can be received or otherwise interrogated by a user ID module of the navigation system, and then provided to the route generator module 111. Any number of identity determination schemes (e.g., biometric sensors that enable touch or voice recognition, or any other available sensors that uniquely identify an individual driver) can be employed.

The disfavored route modeler 205 is programmed or otherwise configured to learn a model of user dislikes. For example, if the navigation system directs a user to make a particular turn, and the user consistently does not make that turn, then the disfavored route modeler 205 can assign a "disfavored turn" penalty or otherwise indicate a disfavored status of that turn so that the route generator 111 will then stop suggesting that turn (because of its "poor" status in the model). The turn could be, for example, illegal, difficult, or otherwise undesirable. For instance, the car might have too large a turning radius to make a particular u-turn comfortably. Other suggested route options that are consistently rejected by the user can be assigned a penalty or designated as disfavored in a similar fashion.

Thus, the favored route modeler 203 is for learning preferences, and disfavored route modeler 205 is for learning negative preferences (note that these complementary functionalities can be integrated into a single module if so desired). In one particular embodiment, either or both the favored route modeler 203 and disfavored route modeler 205 are configured to learn while the user is driving without necessarily using the navigation system. In this sense, these modules can operate in an observation mode or an observation-navigation mode. The modelers 203 and/or 205 (or other suitable module included in the navigation system such as the route generator module 111) can compare (after the fact) the user's self-chosen route to a route that would have been suggested by the navigation system. From this comparison, the modelers 203 and/or 205 can systematically learn, for example, to avoid driving certain routes, even though it would have been shorter to go that way.

Like the favored route modeler 203, the disfavored route modeler 205 can also receive optional user input/feedback to allow further customization of the disfavored route models. In one such embodiment, the disfavored route modeler 205 is further configured to query the user for explicit confirmation before learning to avoid a road/turn/area. Such explicit user input/feedback would improve accuracy of the navigation system.

Also, and in a similar fashion to that discussed with reference to the road speed modeler 201, the favored route modeler 203 and/or the disfavored route modeler 205 can employ clustering techniques to learn favored route models for different inferred conditions (e.g., weather conditions, urgency of driver, traffic due to construction/accident/event, etc) that are determined by the different driving behaviors observed by the system's sensors (e.g., 101, 102, and/or 103). For example, the disfavored route modeler 205 can be configured to initially learn a separate disfavored route model for each driving session (e.g., system instructs driver to turn left, but he did not; therefore the road segment corresponding to that left turn gets a penalty within that disfavored route mini-model in the form of a low value). Clustering techniques (e.g., HAC or other such suitable technique) can then be applied to these disfavored route mini-models. This clustering may result, for instance, in the formation of two clusters: one cluster where the driver refuses to make left turns, and another where he agrees to (and does) make those same left turns. Such a distinction may correspond, for example, to rush-hour vs. not rush-hour (note that the inferred condition can be associated with a more explicit condition of time). In any case, disfavored and/or favored route mini-models can be clustered into two or more alternate models, which can then be applied (as appropriate, depending on condition weights as previously discussed) to subsequent driving sessions.

Again, determining which favored/disfavored route model to apply can be computed by employing probabilistic modeling with Bayesian updates. In more detail, as a new driving session is started, the favored route modeler 203 (and/or the disfavored route modeler 205, if so desired) assigns a prior probability (or weight) to each of the N inferred conditions (e.g., assume there is a sports stadium on the route in question and the inferred conditions include a "big event today" condition and a "no big event today" condition). As driving proceeds, the favored route modeler 203 collects observations about speed, braking (or other driving actions relevant to the favored route model). Each time an observation is collected by the favored route modeler 203, a determination is effectively made as to how consistent is that observation with each of the N inferred conditions (e.g., slower speeds with significant braking tends to indicate that stadium two miles down the road is active). The favored route modeler 203 performs a Bayesian update of the probability (or weight) on each of the N conditions accordingly. Thus, at any moment in time, there is a set of probabilities (or weights), one weight per condition, that indicates how likely it is that a particular condition in fact applies to the current driving session. This set of condition weights can be stored, for example, along with the favored route models in the storage 211. The route generator module 111 can then reason probabilistically from those weights when generating route candidates. In the stadium example, assume the "big event today" condition has a weight of 0.9, and the "no big event today" condition has a weight of 0.1. In this example case, the "no stadium road" model can be used as opposed to the alternate but normally preferred "stadium road" model. Thus, the route generator module 111 will use the "no stadium road" model, and direct the driver to take the next right turn and along a back street route past the stadium. Note that the user need not know of the stadium or event schedule. Rather, the system can be programmed, for instance, to know the location of all major stadiums and event centers. Thus, the system will have explicit conditions (e.g., proximity to stadium and known event time) and implicit conditions (e.g., based on slow speed and excessive braking) Given such conditions, the system can automatically detour the driver around the stadium/event traffic.

In the embodiment shown in FIG. 2, the models generated by the favored route modeler 203 and the disfavored route modeler 205 are stored in model storage 211. Their respective condition weights can be stored in storage 211, and updated as data becomes available. The models and condition weights can then be provided to or otherwise accessed by the route generator module 111, so that personalized and adaptive driving directions can be provided to the user.

The hazard modeler 207 is programmed or otherwise configured to learn a model of hazards. In one such embodiment, the navigation system can identify potentially hazardous conditions by detecting roads that have narrow passageways, high traffic volume, and/or an above-average incidence of avoidance maneuvers, such as sudden stops, skids, swerves, horn-honking, or more severe indicators such as airbag deployments. For example, if the navigation system is equipped with sufficient accelerometers, it could detect roads with a lot of potholes (due to vertical or z-axis acceleration or movement of vehicle). Likewise, the system could include braking sensors for detecting braking and anti-lock brake activation, a horn sensor for sensing use of horn (or other car horns), swerving sensor (for detecting sudden turns of steering wheel at relatively high speeds), proximity sensors (for detecting high traffic volume and narrow passageways), impact sensors, and any other such sensors 102. The hazard modeler 207 can receive input from available system sensors, and assign roads believed to be hazardous (based on received sensor data) a hazard penalty. Alternatively, or in addition to, hazard modeler 207 can track road speed for use when the user is driving slowly. For example, if the user is driving unusually slow (e.g., at a speed 2 standard deviations below the normal speed), and is brake-pumping and/or activating the antilock brakes more often than usual on a given road, then that road segment's hazard level can be increased in the hazard model. As will be explained in turn, such model data may be particularly helpful for future route selection during inclement weather (e.g., last time it snowed, the antilock brake feature activated well-above the normal activation level for this particular route; therefore, avoid suggesting this route during inclement weather). The resulting hazard model is stored in the model storage 211. The route generator module 111 will then avoid hazardous roads indicated by the model when finding directions.

Also, and just as with other modelers discussed herein, the hazard modeler 207 can be configured to learn models of various explicit conditions, such as rush-hour hazard model (which tends to avoid routes that include high traffic volume during rush hour, where rear-end collisions are frequent). Likewise, the hazard modeler 207 can be configured to learn models of various implicit conditions, by noticing that such conditions are correlated with observable conditions. For example, the hazard modeler 207 may end up learning one hazard model for snowy conditions, and an alternate hazard model for dry conditions. In such a case, as soon as it is determined that the driver is driving consistently slower than usual in conjunction with defensive braking (e.g., brake pumping over longer braking distances) in accordance with the snowy condition hazard model, a Bayesian update method as previously described can operate to assign more weight on the snowy condition hazard model learned, and will make future road choices (e.g., and issue driving warnings) accordingly. Clustering techniques and similarity metrics can be used here as well, as previously described. For instance, the hazard modeler 207 can initially learn a hazard mini-model for each driving session, and group the mini-models together based on a similarity metric.

The navigation system may further include reporting capabilities. For example, the hazard modeler 207 (or a dedicated reporting module having access to models stored in storage 211) could automatically report severe potholes to the city where the pothole was encountered. In one such case, once a pothole is detected, the navigation system can auto-dial a cell phone (e.g., integrated into the system, or docked in the system by the user) and deliver a "hazard message." The hazard message can be, for example: "Pothole at Main and 17$^{th}$ Street" as articulated by the driver, or a voice generation module that receives GPS coordinates of the pothole from the GPS receiver 101. Alternatively, the hazard message can be a computer generated code (e.g., a series of pulse tones of the cell phone). In one such case, the code is selected from a pre-established set of codes included in a reporting program for the area (e.g., local, regional, or national reporting program sponsored by government).

If the driver is driving aggressively on a road segment that the navigation system knows is hazardous (based on the learning of hazard modeler 207), the navigation system can be further configured to warn (e.g., by a gentle beep or pre-recorded voice message of: "this road has been reported as hazardous" or "you are driving at above-average speeds for this particular road"). The user could disable such warnings from being issued if so desired, or dismiss one particular warning that continues to be delivered during a driving session. In general, such warnings could be fully configurable by the user.

The map update module 209 is programmed or otherwise configured to learn map updates. In more detail, if the navigation system observes (based on data GPS receiver 101) that the driver is driving along a non-road (e.g., according to map data in storage 109), the map update module 209 can learn that there is a road there. The road may be, for example, a new road or a road that simply has not been previously documented in available map data. In some cases, the map update module 209 can also learn about the removal or reconstruction of a road or other route attribute as well. For instance, if the map update module 209 observes that the driver is accelerating up to 65 mph to get onto a freeway 200 feet later than where module 209 thought the on-ramp was (e.g., based on data received by module 209 from GPS receiver 101), and the driver never takes the on-ramp that it thought was there, then it is probably safe to infer that the on-ramp has been reconstructed. In the embodiment shown, the user can provide optional user feedback/input to the map update module 209 to directly indicate such new roads or changed route conditions. Such user provided data can be stored in storage 211 for access by the route generator module 111 and/or integrated into the map data in the map data storage 109. In addition, the navigation system can be configured to report updates back to the mapping company (e.g., by operation of a reporting module, or by user feedback to the mapping company).

Attribute Model Generation Methodology

Figure 3:
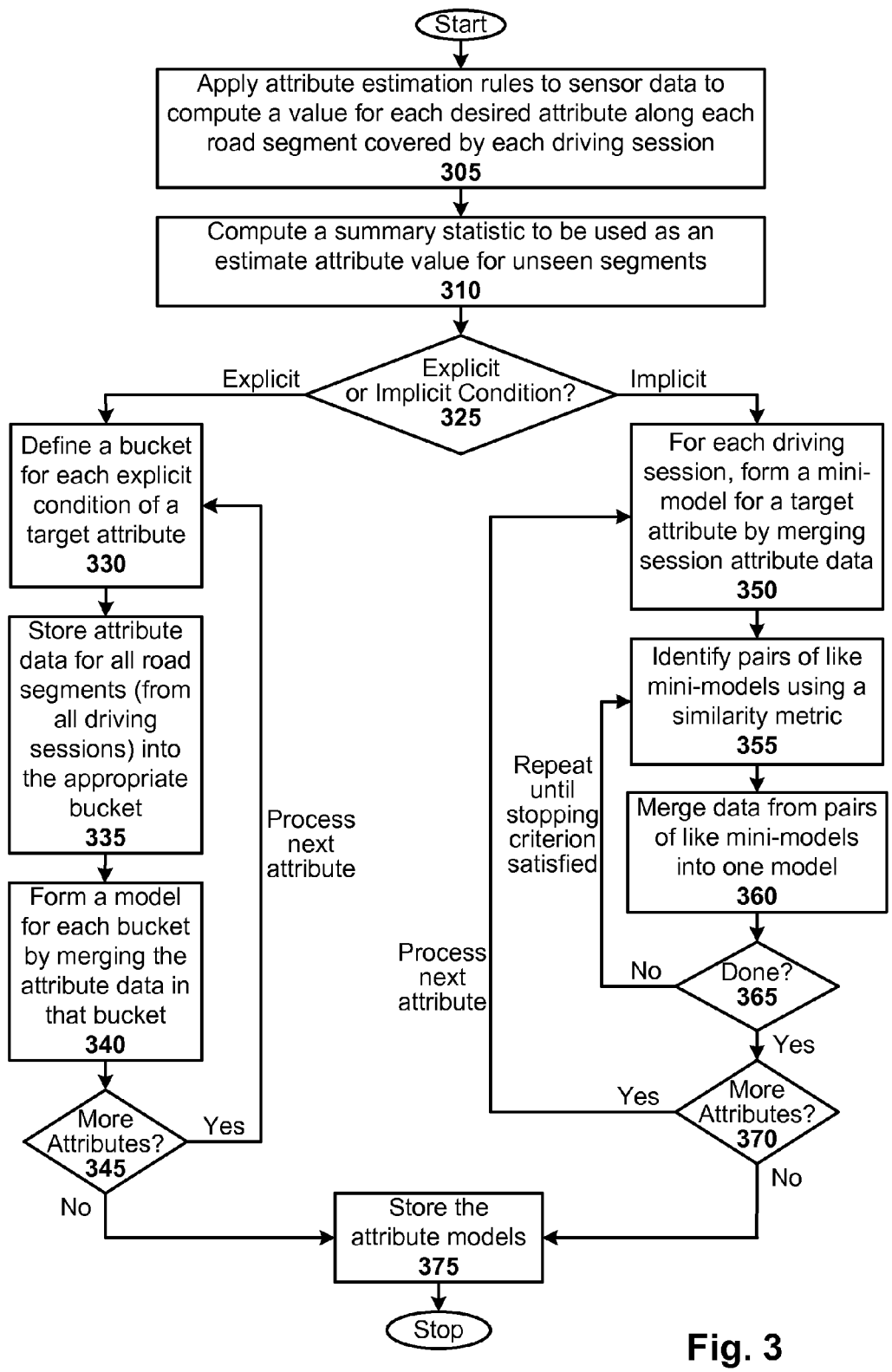
FIG. 3 illustrates a method for generating attribute models for use in the adaptive navigation system of FIG. 1, in accordance with one embodiment of the present invention.

FIG. 3 illustrates a method for generating attribute models for use in the adaptive navigation system of FIG. 1, in accordance with one embodiment of the present invention. This method can be carried out, for example, by the attribute model learning module 107, as described with reference to FIGS. 1 and 2. As previously explained, this module (or its sub-modules) can be implemented as executable code encoded on one or more machine-readable mediums, in accordance with one particular embodiment.

As previously explained, an attribute model is derived from one or more driving sessions, and may include a mapping from road segment to a measured (or derived) attribute value, or an estimate of the attribute value for those road segments not yet actually traveled on by the user. The mapping gives a summary statistic (such as mean or median or other suitable statistic) of the attribute values that have been observed in driving sessions for that segment. The attribute value for unseen road segments can be an a default value such as an estimate summary statistic, as previously explained.

Referring now to the specific details of FIG. 3, the method includes applying 305 attribute estimation rules to sensor data to compute a value for each desired attribute along each road segment covered by each driving session. As previously explained, the attribute estimation rules can be direct "identity" rules (where the attribute value can be directly measured, such as for road speed measured by a speedometer or derived from GPS data), or indirect rules (where the attribute value can be inferred or otherwise derived from one or more measurements, such as for road safety as indicated by temperature, skidding, antilock brake activation, and/or other such ice detection sensors). For unseen (not yet traveled by the user) road segments not yet traveled, the method includes computing 310 a summary statistic (e.g., or otherwise assigning a default value). The method further includes learning conditional variants of each attribute model. In more detail, and with reference to FIG. 3, the method continues with determining 325 if an explicit or implicit condition (or both) applies to a given conditional variant of a model.

For explicit conditions, the method includes defining 330 a bucket (any data bin having known boundaries, such as a road speed bucket for a specific time period in the day) for each explicit condition of a target attribute, and storing 335 observed attribute data for all road segments (from all driving sessions) into the appropriate buckets. The method continues with forming 340 a conditional variant model for each bucket by merging the attribute data in that bucket (e.g., taking mean or median). The result may be, for example, a road speed model for each of rush-hour morning, mid-day, rush-hour evening, and off-peak. The method may further include determining 345 if there are more attributes. If so, the processing of steps 330 through 345 is repeated for each of those attributes. Note that this multi-attribute processing can be done serially (one attribute at a time) or in parallel, depending on available processing power.

For implicit conditions, the method includes forming 350 (for each driving session) a mini-model for a target attribute by statistically merging session attribute data. The method continues with identifying 355 pairs of like mini-models using a similarity metric as previously explained (e.g., HAC or other suitable clustering algorithm), and merging 360 data from pairs of like mini-models into one model (e.g., by aggregating data from each of the two mini-models). This combined model is essentially a model built from the union of the driving sessions from which the two like mini-models were built.

The method includes determining 365 if a stopping criterion is met. If not, then the identifying 355 and merging 360 steps are repeated. For instance, the similarity metric is applied to each pair of models, and the pair of models with the highest similarity rating is identified (step 355). If this highest similarity is high enough (e.g., based on a predefined threshold or other stopping criterion as determined at step 365), then data from the two mini-models is merged to form a combined model (step 360). The identifying 355 and merging 360 steps are repeated until the highest similarity identified is not high enough, at which point processing for that particular target attribute stops. At that point, the method may further include determining 370 if there are more attributes. If so, the processing of steps 350 through 370 is repeated for each of those attributes. Just as with explicit conditions, such multi-attribute processing can be done serially (one attribute at a time) or in parallel.

If there are no more attributes to process (as determined at steps 345 and 370), the method continues with storing 375 the resulting conditional variants of each attribute model, so that they can subsequently be accessed by a route generator as discussed herein. Note that explicit or implicit conditional variants of an attribute model can be learned, or both explicit and implicit conditional variants of an attribute model can be learned. For example, the measured or otherwise observed data could first be partitioned into buckets by explicit conditions, and then clustered (e.g., using HAC or other suitable algorithm) within each bucket to form implicit conditions within each explicit condition. Alternatively, the data could first be clustered into implicit conditions, and then each implicit condition can be broken down into buckets corresponding to the explicit conditions. In this sense, FIG. 3 may include additional loops (e.g., one in each of the explicit and implicit loops), where for each attribute being processed, a determination can be made as to whether there are more conditions for a target attribute. If so, the method repeats from step 325. Such an embodiment allows for the processing of both implicit and explicit conditions for the target attribute.

Route Generation Methodology

Figure 4A:
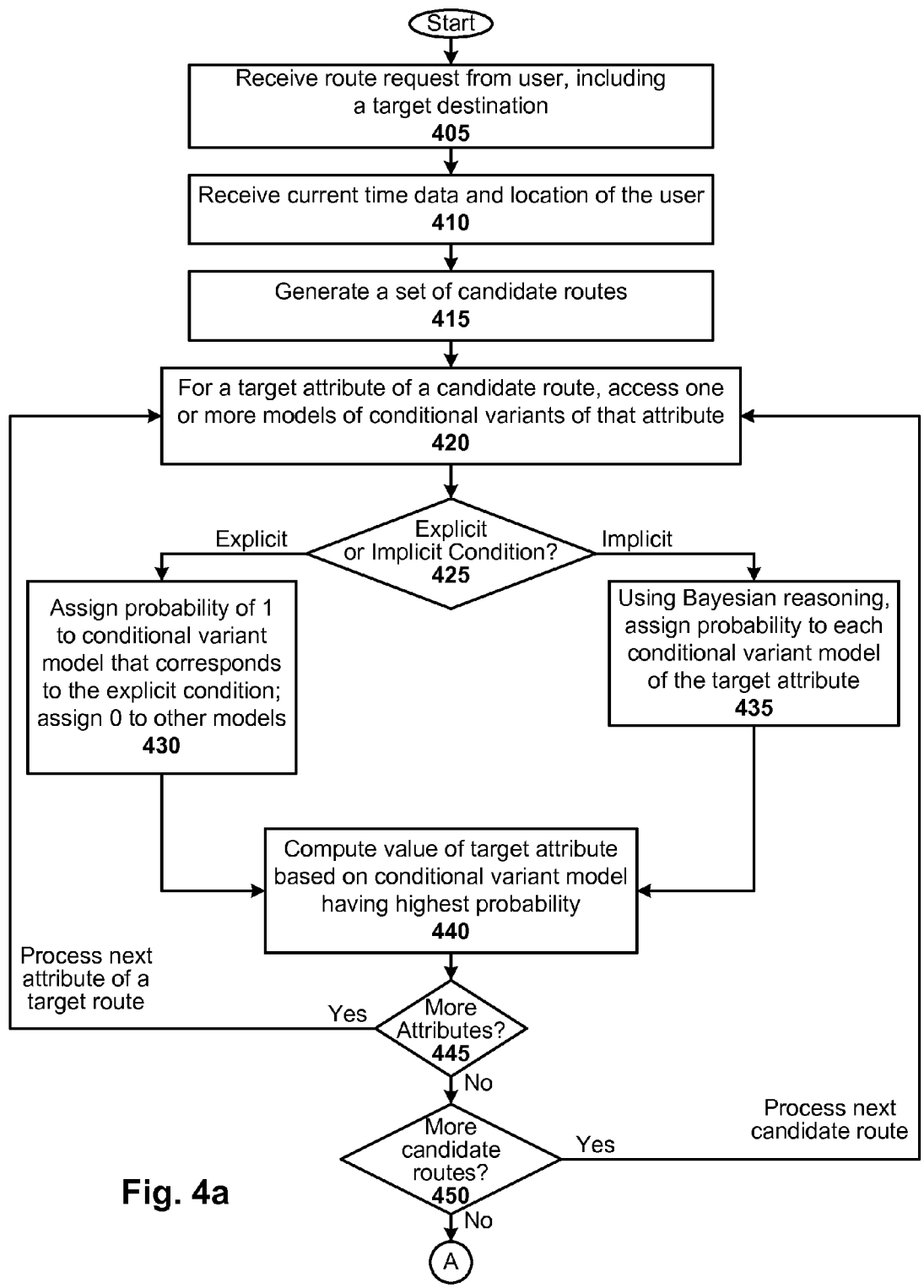
FIGS. 4a and 4b illustrate a method for generating driving directions based on attribute models, in accordance with one embodiment of the present invention.
Figure 4B:
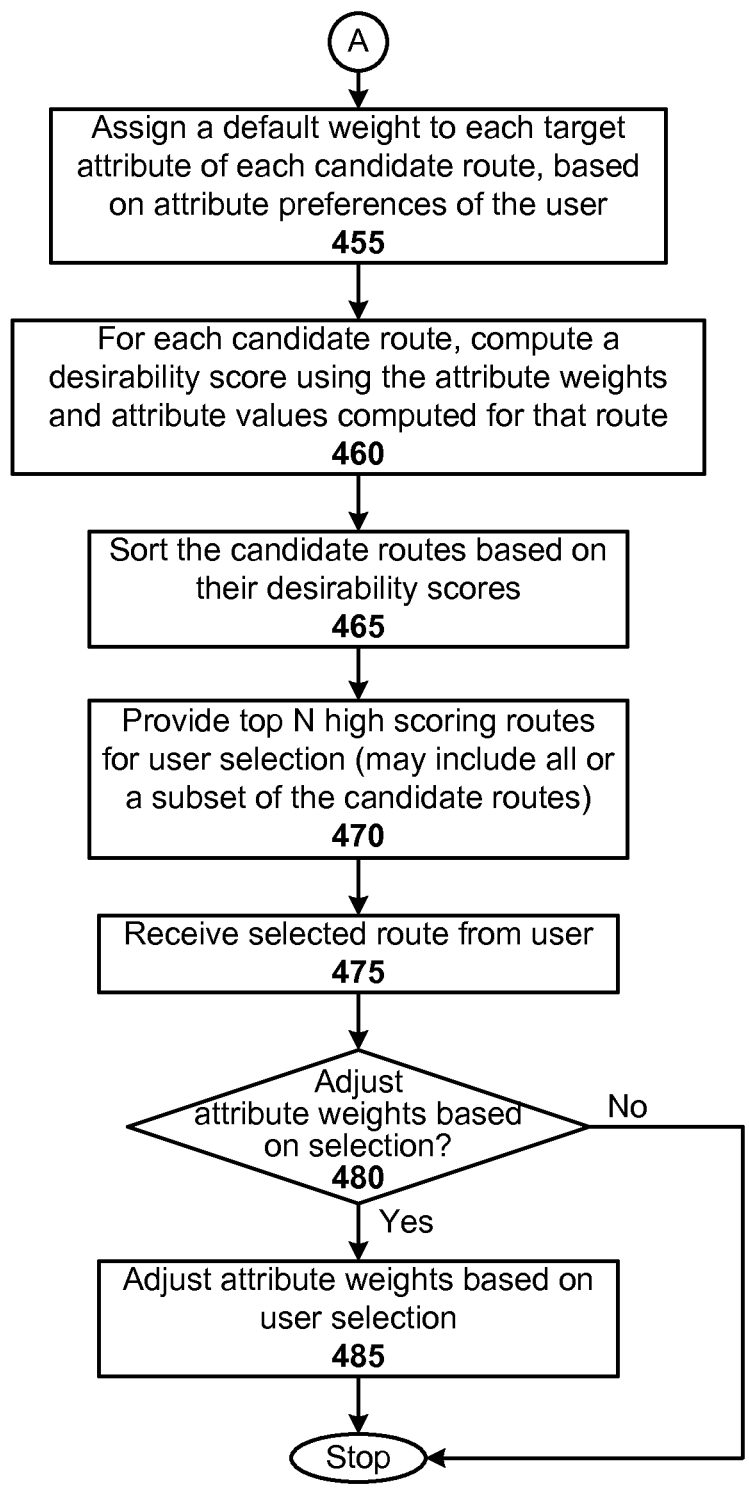

FIGS. 4a and 4b illustrates a method for generating driving directions based on attribute models, in accordance with one embodiment of the present invention. This method can be carried out, for example, by the route generator module 111 and the attribute weighting module 113, as described with reference to FIG. 1. As previously explained, such modules (or their sub-modules) can be implemented as executable code encoded on one or more machine-readable mediums, in accordance with one particular embodiment.

The method begins with receiving 405 a route request from the user, including a target destination. The target destination can be provided via a user interface, as typically done (e.g., key pad or verbal entry). The method continues with receiving 410 current time data and the current location of the user, such as that received from a GPS receiver and a dead-reckoning sensor. Such current time and user location data can be used in time-sensitive route generation (e.g., it is currently 7 am, so use rush hour models), as will be apparent in light of this disclosure.

The method continues with generating 415 a set of candidate routes. In one particular case, each route may include one or more segments. As previously explained, a segment is the basic unit for which road attributes (e.g., speed, hazard, and user preference) can be learned. For a target attribute of a candidate route, the method continues with accessing 420 one or more models of conditional variants of that attribute. Recall that for a given attribute, there is a set of one or more models for conditional variants of that attribute (e.g., for a road speed attribute, there may be two models corresponding to wet-weather driving and dry-weather driving). These conditional variant models can be accessed, for example, from a storage as shown in FIGS. 1 and 2 (storage 109 and/or 211).

The methodology operates to determine which of these conditional variant models to apply to the current driving session. This can be accomplished, for example, by assigning a probability to each conditional variant. In more detail, the method continues with determining 425 if a conditional variant corresponds to an explicit or implicit condition. For an explicit condition, the method continues with assigning 430 a probability of 1 to the conditional variant model that corresponds to the explicit condition (e.g., rush-hour road speed model that applies during 6 am-9 am), and assigning a probability of 0 to other models (e.g., mid-day and weekend road speed models). For an implicit condition, the method includes assigning 435 a probability to each conditional variant model of the target attribute, using Bayesian reasoning as previously explained (e.g., assigning 0.8 for the "rainy weather" condition, and 0.2 for the "dry weather" condition, based on measured, inferred, or otherwise observed data of the current driving session). The probability for a model can be assigned, for example, by starting with a prior probability proportional to how many driving sessions that model was derived from, and then adjusting this probability according to how well that model explains the observable measurements that have been seen for the current driving session so far (e.g., if the measurements so far are consistent with road speeds for driving in rainy weather, then the wet-weather conditional variant model will get a higher probability. Attribute estimation rules (such as those used in off-line model learning, as previously discussed), can be used to convert from observable measurements of the current driving session to attribute values. In one particular embodiment, the method may include recomputing the probabilities periodically during the current driving session. This is because the longer the current driving sessions goes on, the more information will be available about the driving conditions (e.g., the user may skid or engage anti-lock brakes), thereby enabling the calculation of more accurate probabilities about which conditional variants to apply in route scoring.

The method continues with computing 440 a value of the target attribute based on the conditional variant model having highest probability. In one particular embodiment, once probabilities have been assigned to each conditional variant, the expected value of the attribute for a candidate route can be calculated as a weighted average (e.g., sum over the conditional variants, and collect the probability of the ith conditional variant multiplied by the attribute value predicted by the ith conditional variant). This yields the value for the attribute as predicted by the combination of all of the conditional variants of the model for the attribute. The method may further include determining 445 if there are more attributes. If so, the processing of steps 420 through 445 is repeated for each of those attributes for the target route. Again, such multi-attribute processing can be done serially (one attribute at a time) or in parallel. If there are no more attributes to process (as determined at step 445), the method continues with determining 450 if there are more candidate routes to process. If so, the processing of steps 420 through 450 is repeated for each of those routes. The result of this processing is that each of the candidate routes is assigned one or more attribute values which can be used to score that route.

In this particular embodiment, and as previously explained, once all the candidate routes are processed, the method continues with assigning 455 an attribute weight to each attribute of each candidate route, based on attribute preferences of the user. Initially, these attribute weights can be set to a user-configurable or otherwise default value which is then refined based on subsequent user input, as explained herein. The initial preferences can be provided, for example, via a voice command and/or data entry user interface. For discussion purposes, assume that the user prioritizes attributes in the following order: (1) road speed, (2) road familiarity, and (3) road safety. Thus, all other things equal, when a given segment has the attribute of consistently high road speed, it will generally be scored higher than those segments not possessing that attribute (due to the attribute weight). Alternatively, attributes can be effectively turned-off (e.g., only consider road speed, and ignore familiarity and safety attributes). The user can turn attributes on or off via the user interface. User preferences can be stored in a configuration file accessible during driving sessions. The configuration file can be updated by the user (via the user interface) as preferences change.

The method continues with computing 460 a desirability score for each candidate route, using the attribute weights and attribute values computed for that route, as previously explained (e.g., $Score_r = SUM\ w_i\ x_i$). The method continues with sorting 465 the candidate routes based on their desirability scores, and providing 470 the top n high scoring routes for user selection (which may include all or a subset of the candidate routes). The user can preview the scored routes via a user interface, if so desired. The method continues with receiving 475 a selected route from the user, and then determining 480 if the attribute weights need to be adjusted based on that user selection. If so, the method continues with adjusting 485 the attribute weights based on the user selection, as previously explained. The selected route can then be presented to the user for use in actual navigation to the target location.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A non-transitory machine-readable storage medium encoded with instructions that, when executed by one or more processors, cause the processor to carry out a process for generating directions for use in navigation during a current driving session, the process comprising:
    receiving a target destination;
    generating at least one candidate route;
    accessing a plurality of conditional variant models associated with a target attribute of the at least one candidate route;
    assigning a probability to each of the plurality of conditional variant models;
    probabilistically determining that one of the plurality of conditional variant models associated with the target attribute corresponds to a condition of the target attribute by evaluating the probabilities assigned to each of the plurality of conditional variation models, the plurality of conditional variant models learned from previous user driving sessions;
    scoring the at least one candidate route using the determined conditional variant model; and
    providing a scored route to a user.

2. The machine-readable storage medium of claim 1, the process further comprising:
    determining a driver ID for the current driving session; and
    restricting the plurality of conditional variant models associated with the target attribute to include only conditional variant models associated with the driver ID.

3. The machine-readable storage medium of claim 2, wherein determining a driver ID for the current driving session comprises at least one selected from a group consisting of:
    receiving login criteria associated with the driver ID;
    detecting an ignition key associated with the driver ID;
    detecting a preferred seat setting associated with the driver ID;
    detecting a preferred mirror setting associated with the driver ID; and
    detecting a driver weight associated with the driver ID.

4. The machine-readable storage medium of claim 1 wherein the target attribute is a road preference attribute.

5. The machine-readable storage medium of claim 4, the process further comprising:
    assigning a weight to the road preference attribute based on one or more route selections by the user.

6. The machine-readable storage medium of claim 4, the process further comprising:
    increasing the computed score for the candidate route in response to the road preference attribute indicating a favored route.

7. The machine-readable storage medium of claim 6, the process further comprising:
    decreasing the computed score for the candidate route in response to the road preference attribute indicating a disfavored route.

8. The machine-readable storage medium of claim 1, the process further comprising:
    detecting a change in the condition of the target attribute; and providing an altered route to the user based on the detected change.

9. The machine-readable storage medium of claim 8, wherein detecting a change in the condition of the target attribute comprises:
   recomputing probabilities for the conditional variant models associated with the target attribute periodically during the current driving session using subsequently observed data of the current driving session; and
   probabilistically determining that a second conditional variant model currently corresponds to the condition of the target attribute.

10. A computer-implemented method for generating directions for use in navigation during a current driving session, comprising:
   receiving, by one or more processors, a target destination provided as input via a user interface;
   generating, by the one or more processors, at least one candidate route;
   accessing, by the one or more processors, a plurality of conditional variant models associated with a target attribute of the at least one candidate route, wherein the plurality of conditional variant models are learned from previous user driving sessions defined at least in part by data obtained by one or more sensors;
   assigning, by the one or more processors, a probability to each of the plurality of conditional variant models;
   probabilistically determining, by the one or more processors, that one of the plurality of conditional variant models associated with the target attribute corresponds to a condition of the target attribute by evaluating the probabilities assigned to each of the plurality of conditional variation models;
   scoring, by the one or more processors, the at least one candidate route using the determined conditional variant model; and
   providing, by the one or more processors, a scored route to a user via an output interface.

11. The computer-implemented method of claim 10, the method further comprising:
   determining, by the one or more processors, a driver ID for the current driving session; and
   restricting, by the one or more processors, the plurality of conditional variant models associated with the target attribute to include only conditional variant models associated with the driver ID.

12. The computer-implemented method of claim 11, wherein determining a driver ID for the current driving session comprises at least one selected from a group consisting of:
   receiving login criteria associated with the driver ID;
   detecting an ignition key associated with the driver ID;
   detecting a preferred seat setting associated with the driver ID;
   detecting a preferred mirror setting associated with the driver ID; and
   detecting a driver weight associated with the driver ID.

13. The computer-implemented method of claim 10 wherein the target attribute is a road preference attribute.

14. The computer-implemented method of claim 10, the method further comprising:
   increasing, by the one or more processors, the computed score for the candidate route in response to the road preference attribute indicating a favored route.

15. The computer-implemented method of claim 14, the method further comprising:
   decreasing, by the one or more processors, the computed score for the candidate route in response to the road preference attribute indicating a disfavored route.

16. The computer-implemented method of claim 15, the method further comprising:
   detecting, by the one or more processors, a change in the condition of the target attribute; and
   providing, by the one or more processors, an altered route to the user based on the detected change.

17. The computer-implemented method of claim 16, wherein detecting a change in the condition of the target attribute comprises:
   recomputing probabilities for the conditional variant models associated with the target attribute periodically during the current driving session using subsequently observed data of the current driving session; and
   probabilistically determining that a second conditional variant model currently corresponds to the condition of the target attribute.

18. A system comprising:
   a memory comprising instructions; and
   a processor configured to execute the instructions to:
      receive a target destination;
      generate at least one candidate route;
      access a plurality of conditional variant models associated with a target attribute of the at least one candidate route;
      assign a probability to each of the plurality of conditional variant models;
      probabilistically determine that one of the plurality of conditional variant models associated with the target attribute corresponds to a condition of the target attribute by evaluating the probabilities assigned to each of the plurality of conditional variation models, the plurality of conditional variant models learned from previous user driving sessions;
      score the at least one candidate route using the determined conditional variant model; and
      provide a scored route to a user.

19. The system of claim 18, wherein the processor is further configured to execute the instructions to:
   determine a driver ID for the current driving session; and
   restrict the plurality of conditional variant models associated with the target attribute to include only conditional variant models associated with the driver ID.

20. The system of claim 19, wherein the processor is further configured to execute the instructions to:
   receive login criteria associated with the driver ID;
   detect an ignition key associated with the driver ID;
   detect a preferred seat setting associated with the driver ID;
   detect a preferred mirror setting associated with the driver ID; and
   detect a driver weight associated with the driver ID.

* * * * *